United States Patent
Mayer et al.

[11] Patent Number: 5,956,949
[45] Date of Patent: Sep. 28, 1999

[54] VARIABLE EXHAUST SYSTEM FOR V-ENGINES II

[75] Inventors: Thomas E Mayer, Glessen; Patrick Phlips, Cologne; Klemens Grieser, Langenfeld; Heinrich Z Krzykowski, Herdecke, all of Germany

[73] Assignee: Ford Global Technologies, Inc.

[21] Appl. No.: 09/112,505

[22] Filed: Jul. 9, 1998

[30]  Foreign Application Priority Data

Jul. 9, 1997  [DE]  Germany .......................... 197 29 283

[51] Int. Cl.⁶ ...................................................... F01N 3/10
[52] U.S. Cl. .................. 60/301; 60/323; 60/284; 60/287
[58] Field of Search .............................. 60/301, 302, 305, 60/311, 323, 284, 287, 313

*Primary Examiner*—Edward K. Look
*Assistant Examiner*—Binh Tran
*Attorney, Agent, or Firm*—James J. Dottavio

[57] ABSTRACT

An exhaust system is provided for a motor vehicle having a V-type internal combustion engine forming two banks of cylinders. The exhaust system includes first and second exhaust manifolds, the first manifold connected to the first cylinder bank and the second manifold connected to second cylinder bank. A pair of catalytic converters communicate exhaust from the exhaust manifolds. An exhaust pipe communicates exhaust from each manifold. The first exhaust pipe extends from a first side of the vehicle to a second side of the vehicle. The second exhaust extends from the second side of the vehicle first side of the vehicle. A NOx trap receives exhaust from the second exhaust pipe. A third exhaust pipe communicates exhaust between the first catalytic converter and the NOx trap. The third exhaust pipe does not extend to the second side of the vehicle. A control valve selectively blocks exhaust flow through the first pipe to direct the exhaust through the third exhaust pipe.

11 Claims, 3 Drawing Sheets

VARIABLE EXHAUST SYSTEM FOR V-ENGINES II

FIELD OF THE INVENTION

The invention relates to a motor vehicle having a front-mounted internal combustion engine with its cylinders in a "V"-arrangement, with the centre line pointing in the direction of travel, wherein the exhaust gases from each bank of cylinders are passed on via two respective exhaust pipes of different cross-section and the exhaust pipes having the larger cross-section can be shut off by means of control valve units, and wherein the exhaust gases from the cylinders on each one side are led to a catalytic converter and in each case a respective by-pass pipe having markedly smaller cross-section is provided between the exhaust pipes, said by-pass pipes connecting a region of the exhaust pipes of one bank of cylinders to a region of the exhaust pipe of the other bank of cylinders.

BACKGROUND AND PRIOR ART

Arrangements of this kind are designed so that the exhaust gases from each bank of cylinders are passed via separate exhaust pipes to catalytic converters located on the same side of the vehicle. However, this arrangement has the disadvantage that the converter can only be mounted either close to the engine or distant from it, so that it is not possible to provide a short additional heating-up path. A heating-up path would necessarily have about the same length as the main pipe train.

In the earlier-filed German patent application DE-196 53 408.9-13 it has already been proposed to lead the exhaust gases from the cylinders on each one side via an exhaust manifold and an exhaust pipe to the respective other side of the engine and to a catalytic converter also located on said other side, with a control valve unit being incorporated in each exhaust pipe by which the exhaust pipe can be shut off, in each case a respective by-pass pipe of markedly smaller cross-section than the exhaust pipes being provided between the exhaust pipe of one bank of cylinders and the exhaust pipe of the other bank of cylinders, said by-pass pipe connecting a region of the exhaust pipes near to the exhaust manifold of one bank of cylinders to a region near where the exhaust pipe opens into the catalytic converter, located on the same side of the vehicle, for the other bank of cylinders.

However, with this arrangement it can happen that as a result of the exothermic reaction of the three-way converter used, the NOx-trap which is also located in this region is undesirably heated. [it will be appreciated] It is understood that NOx-traps cannot stand very high temperatures.

OBJECT OF THE INVENTION

Accordingly it is the object of the invention to provide an arrangement which avoids [this] the disadvantage of overheating the NOx trap.

SUMMARY OF THE INVENTION

To achieve this object, in accordance with the invention in a motor vehicle having a front-mounted internal combustion engine with its cylinders in a "V"-arrangement, with the centre line pointing in the direction of travel, wherein the exhaust gases from each bank of cylinders are passed on via two respective exhaust pipes of different cross-section and the exhaust pipes having the larger cross-section can be shut off by means of control valve units, and wherein the exhaust gases from the cylinders on each one side are led to a catalytic converter and in each case a respective by-pass pipe having markedly smaller cross-section is provided between the exhaust pipes, said by-pass pipes connecting a region of the exhaust pipes of one bank of cylinders to a region near the inlet end of the exhaust pipe for the other bank of cylinders, the exhaust manifold of each bank of cylinders opens directly into a respective three-way catalytic converter and an NOx-trap is mounted at the end of the exhaust pipe, before the tail pipes. The tail pipes from each cylinder side can be brought together into a common pipe, in which case it is only necessary to provide one NOx-trap.

The advantage of this arrangement is that because the three-way converters are mounted after the exhaust manifolds the converters heat up rapidly on starting-up. However, the heating up of the exhaust gases due to the exothermic reaction of the converters only reaches the NOx-traps connected to them after definite cooling of the exhaust gases because of the extended route of the exhaust pipes.

In an embodiment of the invention a decoupling element can be provided for each bank of cylinders before the three-way converters.

BRIEF DESCRIPTION OF THE DRAWINGS

Embodiments of the invention are illustrated in the drawings, in which.

DETAILED DESCRIPTION OF PREFERRED EMBODIMENTS OF THE INVENTION

Figure 1:
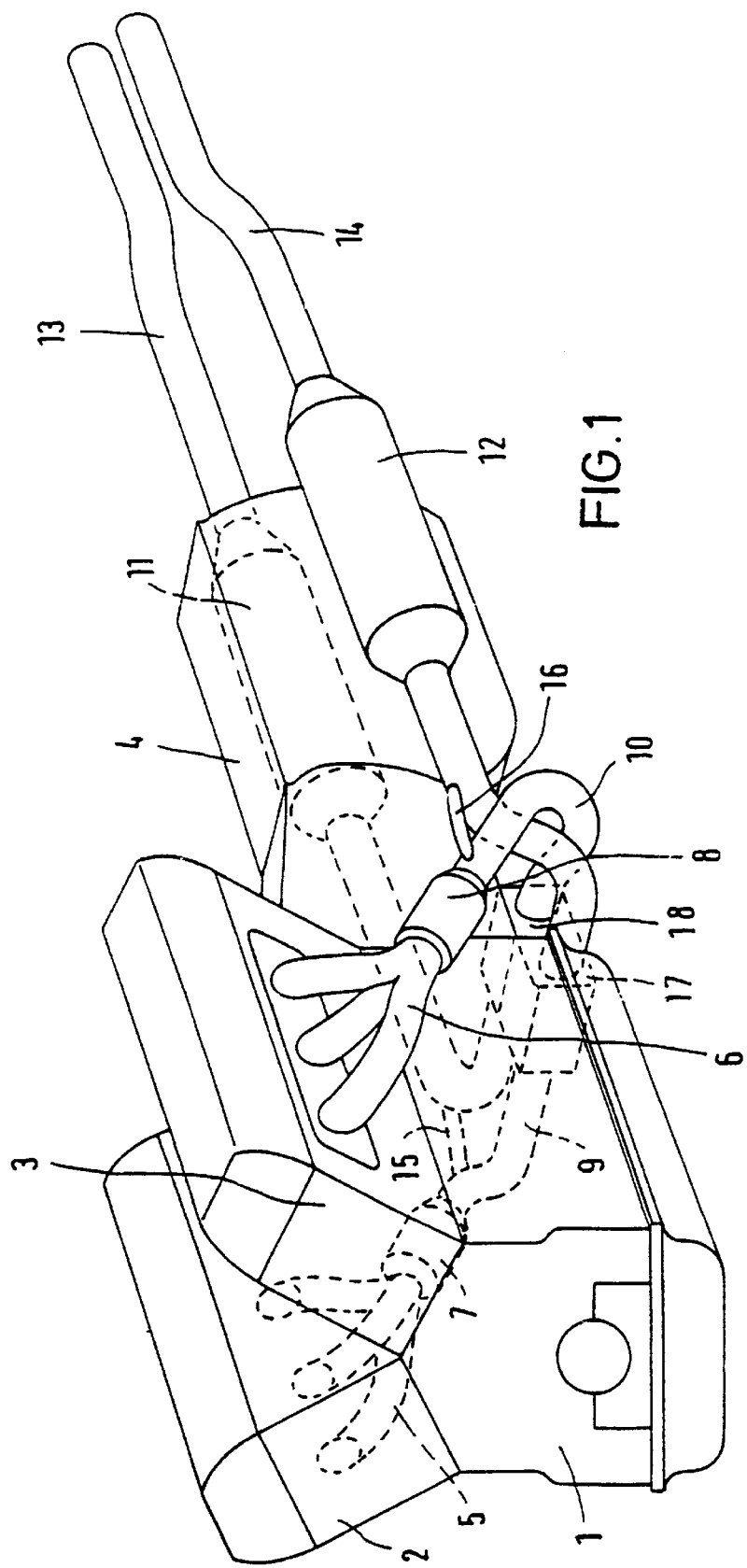
FIG. 1 is a perspective view of the important elements of the invention, showing one embodiment.
Figure 2:
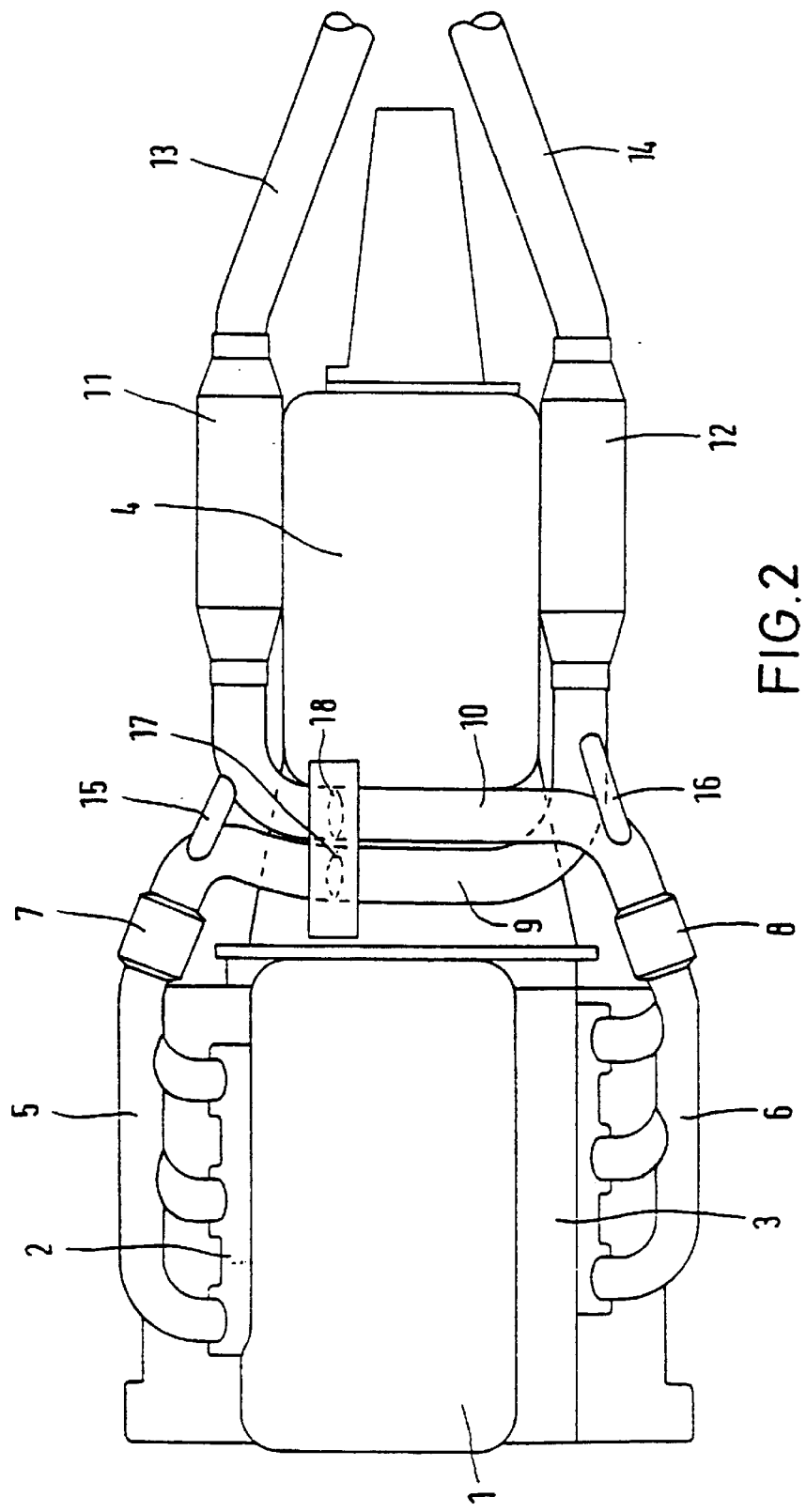
FIG. 2 is a plan view from below of the arrangement in accordance with the invention shown in FIG. 1.

In an exemplary embodiment of the invention illustrated particularly in FIGS. 1 and 2 an internal combustion engine 1 has its cylinders (six in the example) arranged in a "V", with the banks of cylinders denoted by 2 and 3. A gearbox 4 is located behind the engine (from the point of view of the direction of travel). The exhaust gases from the engine 1 pass through exhaust manifolds 5 and 6 to exhaust pipes 9 and 10.

In the example illustrated in FIGS. 1 and 2, the exhaust pipes 9 and 10 for the respective banks of cylinders run behind the engine (from the point of view of the direction of travel) to the other side of the vehicle and then enter a respective NOx-trap 11 or 12 located on that respective side of the vehicle. This device can, if desired, also include a device for collection of sulphur compounds from the fuel used. The route of the exhaust pipes 9 and 10 preferably runs below the engine/gearbox 4 region. In the embodiment shown in FIGS. 1 and 2 control valve units 17 and 18 respectively [by means of which] are provided to selectively substantially shut off flow through the pipes 9 and 10 [can be shut off] under temperature control in order to achieve rapid heating-up of the NOx-traps on starting from cold and are arranged behind the engine 1 (from the point of view of the direction of travel). This is done by means of by-pass pipes 15 and 16, which connect a region near to the exhaust manifolds 5, 6 of each bank of cylinders 2, 3 to the exhaust pipe which is associated with the other bank of cylinders. This results in the exhaust gases being led through the exhaust pipes so to [speak crossways] normally communicate exhaust gas to the other side of the vehicle, while the by-pass pipes form a direct and short path between the corresponding exhaust manifolds and the exhaust pipe which is [really] normally associated with the other bank of cylinders but is in fact on the same side of the vehicle.

Figure 3:
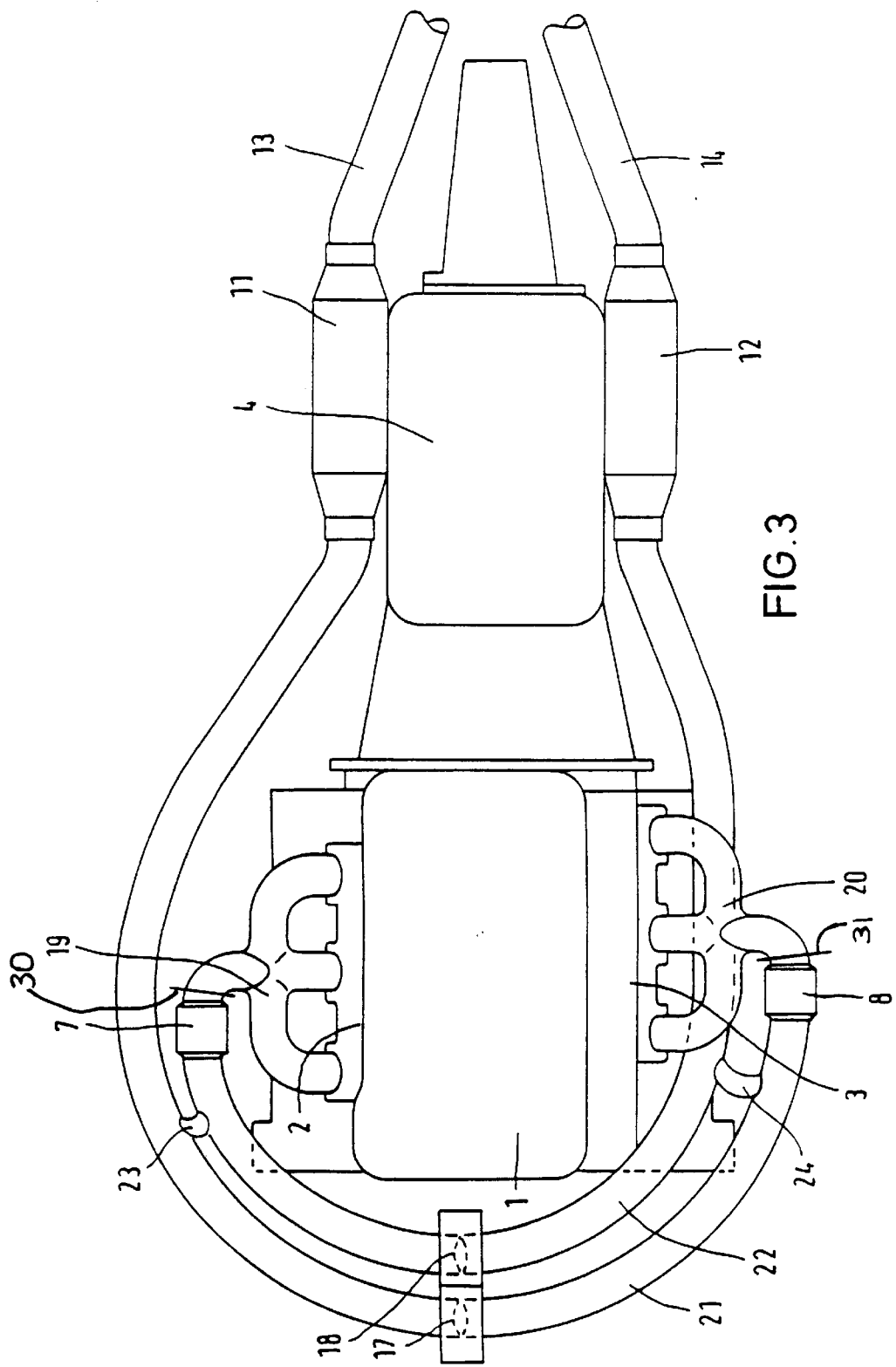
FIG. 3 is a plan view from below of another embodiment of the invention.

In another exemplary embodiment of the invention, as shown in FIG. 3, the exhaust pipes 21 and 22 run from the exhaust manifolds 19 and 20 [first of all forwards] initially toward the front of the vehicle (from the point of view of the direction of travel) and are passed [round] around the engine to the other side of the vehicle, where the feed to the converter on one side of the vehicle then takes place. Here, too, corresponding by-pass pipes are provided, which are denoted by 23 and 24. In this exemplary embodiment the control valve systems 17 and 18 respectively are located in front of the engine (from the point of view of the direction of travel).

All the by-pass pipes in both embodiments are substantially shorter in length than the exhaust pipes in which the control valve units 17, 18 are incorporated; in addition all the by-pass pipes 15, 16, 23, 24 are given a cross-section which is markedly smaller than the cross-section of the exhaust pipes 9, 10, 21, 22.

Three-way converters 7 and 8 are fitted immediately after the respective exhaust manifolds 5 and 6 on each side of the engine. Fitting the converters near the exhaust manifolds ensures that they quickly reach a suitable temperature, particularly in the case of a cold start. This arrangement also ensures that heating up of the exhaust gases by the exothermic reaction of the three-way converters 7 and 8 does not directly reach the NOx-traps 11 and 12, but that during continuous running of the vehicle cooling takes place due to the extended exhaust pipes. Nevertheless it is ensured that on cold starting a suitable operating temperature is also quickly reached for the NOx-traps 11 and 12, through the action of the by-pass pipes 15,16 and 23,24 respectively.

In a preferred embodiment, a decoupling element 30, 31, in the form of a flex coupling, is provided between the exhaust manifold and the exhaust system to compensate the movement between the engine and the exhaust system, as is known to one skilled in the art.

The forms of the invention shown and described herein constitute preferred embodiments of the invention. They are not intended to illustrate all possible forms thereof. The words used are words of description rather than of limitation, and various changes may be made from that which is described herein without departing from the spirit and score of the invention.

What is claimed is:

1. An exhaust system for a motor vehicle having a front-mounted internal combustion engine with a plurality of cylinders arranged in a "V"-configuration, forming two banks of cylinders emitting a flow of exhaust gas therefrom, the exhaust system comprising:

first and second exhaust manifolds, the first manifold connected to the first cylinder bank and the second manifold connected to second cylinder bank for communicating the exhaust gas therefrom;

a first catalytic converter in fluid communication with the first exhaust manifold;

a second catalytic converter in fluid communication with the second exhaust manifold;

a first exhaust pipe having a first end in fluid communication with the first exhaust manifold, the first exhaust pipe extending from a first side of the vehicle to a second side of the vehicle;

a second exhaust pipe having a first end in fluid communication with the second exhaust manifold, the second exhaust pipe extending from the second side of the vehicle to a second end on the first side of the vehicle;

a NOx trap for receiving the exhaust from the second end of the second exhaust pipe;

a third exhaust pipe in fluid communication between the first catalytic converter and the NOx trap, the third exhaust pipe not extending to the second side of the vehicle; and a first control valve for selectively substantially blocking exhaust flow through the first pipe to direct the exhaust through the third exhaust pipe.

2. An exhaust system according to claim 1, further comprising said first pipe having a larger cross-sectional area than the third pipe.

3. An exhaust system according to claim 1, further comprising a second NOx trap for receiving the exhaust from the first exhaust pipe.

4. An exhaust system according to claim 3, further comprising:

a fourth exhaust pipe in fluid communication between the second catalytic converter and the second NOx trap, the fourth exhaust pipe not extending to the first side of the vehicle; and a second control valve for selectively substantially blocking exhaust flow through the second pipe to direct the exhaust through the fourth exhaust pipe.

5. An exhaust system according to claim 4, further comprising said first pipe having a larger cross-sectional area than said third pipe and said second pipe having a larger cross-sectional area than said fourth pipe.

6. An exhaust system according to claim 5, further comprising a pair of tail pipes for communicating exhaust from said NOx-traps, respectively.

7. An exhaust system according to claim 5, further comprising said vehicle having a front end and rear end associated with the normal direction of travel of said vehicle, said cylinder banks extending from the front end toward the rear end.

8. An exhaust system according to claim 5, further comprising a first and second decoupling element provided before the first and second catalytic converters, respectively.

9. An exhaust system according to claim 5, wherein said first and second NOx traps comprise a single NOx trap.

10. An exhaust system according to claim 1, further comprising a fourth exhaust pipe in fluid communication between the second catalytic converter and the NOx trap, the third exhaust pipe not extending to the first side of the vehicle; and a second control valve for selectively substantially blocking exhaust flow through the second pipe to direct the exhaust through the fourth exhaust pipe.

11. An exhaust system according to claim 10, further comprising said first pipe having a larger cross-sectional area than said third pipe and said second pipe having a larger cross-sectional area than said fourth pipe.

* * * * *